(No Model.)
F. L. GOODRICH.
VEHICLE WHEEL RIM.
No. 530,990. Patented Dec. 18, 1894.
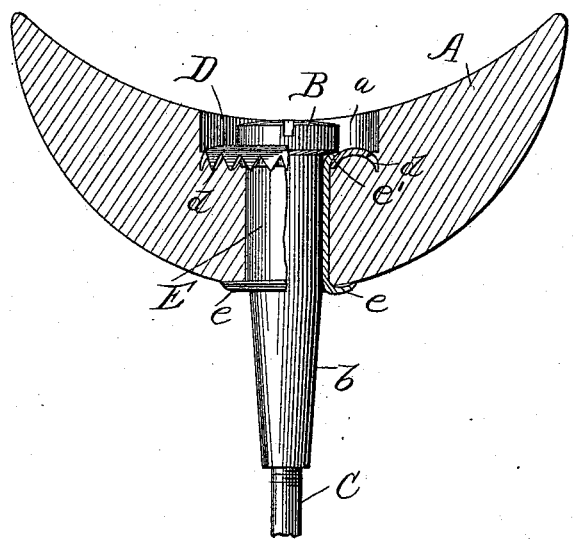
Witnesses
Inventor
F. L. Goodrich
by Elliott Hopkins
Atty's

UNITED STATES PATENT OFFICE.

FRANK L. GOODRICH, OF BELVIDERE, ILLINOIS, ASSIGNOR TO THE NATIONAL SEWING MACHINE COMPANY, OF SAME PLACE.

VEHICLE-WHEEL RIM.

SPECIFICATION forming part of Letters Patent No. 530,990, dated December 18, 1894.

Application filed August 11, 1894. Serial No. 520,018. (No model.)

*To all whom it may concern:*

Be it known that I, FRANK L. GOODRICH, a citizen of the United States, residing at Belvidere, in the county of Boone and State of Illinois, have invented certain new and useful Improvements in Vehicle-Wheel Rims or Fellies, of which the following is a full, clear, and exact specification.

My invention has reference more particularly to wooden or non-metallic rims for bicycle wheels and the improvements relate to means for protecting the edges of the perforations through which the spokes or the stems of their taps or nuts pass.

In forming the spoke perforation in wooden bicycle rims, the wood is often splintered around the edges of the perforations and also on the outer face of the rim; thus affording opportunity for water or moisture to find its way into the interstices of the wood, and also by reason of the space between the spoke and the rim to leak through such space and damage the nut and other interior surfaces; to say nothing of the unsightly appearance of the perforations thus splintered about their edges, and the wide openings between the spoke and the rim.

The primary object of my invention therefore is to provide these perforations with an improved durable water-proof sheath or lining which will protect their edges and also enable the spoke or the stem of its nut to be crowded into it with sufficient force to entirely close the perforation and thus preclude the admission of moisture to the interior of the latter or the rim.

With these ends in view my invention consists in certain features of novelty hereinafter more fully described with reference to the accompanying drawing and particularly pointed out in the claims.

The said drawing represents a transverse sectional view of a bicycle wheel rim provided with my improvements.

A represents an ordinary rim whose convex side may be provided as usual with the counter-sinks $a$ into which are let the heads B of the screw nuts or taps by which the spokes C are tightened. These counter-sinks $a$ are provided in their bottoms around the perforations through which the stems $b$ of the nuts pass, with washers D upon which the heads B take their bearing and are prevented from being pulled through the perforation or sinking into the wood, the edges of the washer D being preferably provided with downturned teeth or spurs $d$ which dig into the wood and prevent their rotation. This feature however is only desirable and not essential.

Driven into the perforation in the rim from the outer side is a metallic or other waterproof sheath E whose outer end is curled or reamed over the edge of the perforation and overlaps the rim as shown at $e$ while its inner end is flared or reamed over the edges of the washer D as shown at $e'$, thus binding the washer D firmly in place even in the absence of the teeth or spurs $d$ which may be omitted when my improved sheath E is employed.

The under side of the screw-head B is preferably slightly beveled as shown and it rests upon the flared or reamed end $e$ of the sheath E so that the pressure on such head induced by tightening the spoke will tend to bind the parts more tightly together rather than to force the sheath out of place.

The stem $b$ of the screw-nut is preferably tapered as shown so that it may be readily inserted and snugly jammed home in the sheath without danger of splitting the rim; thus completely closing the perforation in the rim and precluding the entrance of moisture.

Having thus described my invention, what I claim as new therein, and desire to secure by Letters Patent, is—

1. The combination of a perforated vehicle wheel rim, of a washer arranged around the inner end of said perforation, a sheath passing through said perforation and having its end reamed down over said washer and its outer end flared outwardly over the edge of the perforation and overlapping the rim, and thereby securing both the sheath and the washer in place, and a headed stem passing through said sheath, substantially as set forth.

2. The combination with a perforated vehicle wheel rim, of a washer arranged around the inner end of said perforation, a sheath passing through said perforation and having its inner end reamed down over the edge of said washer and its outer end reamed down over the edge of the perforation and overlapping the rim and thereby holding both the washer and the sheath in place, and a stem passing through said sheath and having a head beveled on its under side and resting with such bevel against the flared end of said sheath, substantially as set forth.

FRANK L. GOODRICH.

Witnesses:
DAVID M. ELDREDGE,
CHAS. F. KING.